Figure 2:
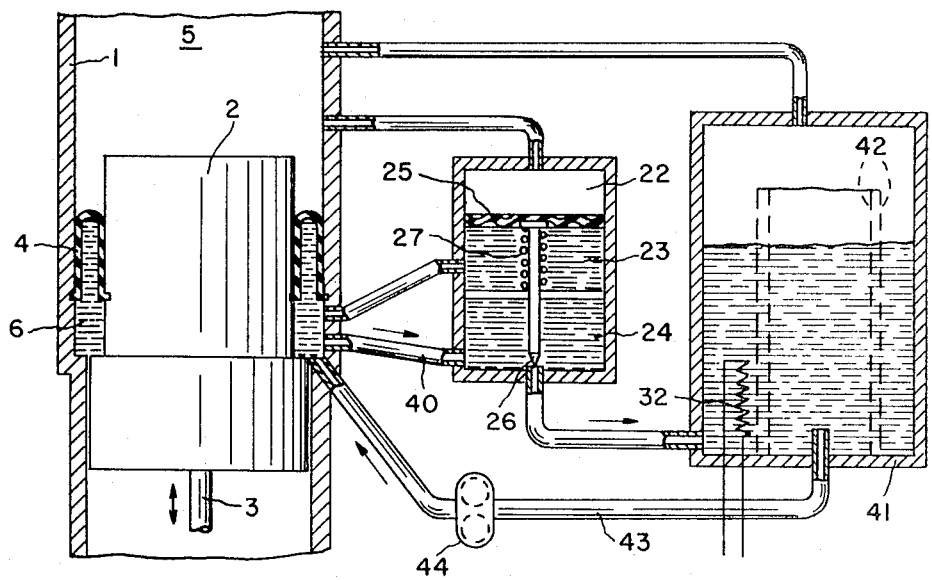

United States Patent

[11] 3,626,811

[72] Inventors: Roelf Jan Meijer; Henricus Cornelis Johannes Beukering; Herman Fokker; Albert August Dros, all of Emmasingel, Eindhoven, Netherlands
[21] Appl. No.: 871,189
[22] Filed: Oct. 16, 1969
[45] Patented: Dec. 14, 1971
[73] Assignee: U.S. Philips Corporation, New York, N.Y.
Original application May 21, 1968, Ser. No. 732,492, now Patent No. 3,487,751, which is a continuation of application Ser. No. 514,293, Dec. 16, 1965, now abandoned. Divided and this application Oct. 16, 1969, Ser. No. 871,189

[54] ROLLING DIAPHRAGM SEAL MEANS FOR REMOVING AND RECOVERING DIFFUSED GAS
3 Claims, 3 Drawing Figs.

[52] U.S. Cl. .................................................. 92/79, 92/84
[51] Int. Cl. .............................................. F15b 21/04
[50] Field of Search ................................. 92/79, 84; 277/15; 55/16, 158; 137/197; 417/385

[56] References Cited

UNITED STATES PATENTS

| | | | |
|---|---|---|---|
| 1,174,631 | 3/1916 | Snelling | 55/16 |
| 2,635,620 | 4/1953 | Deardoff | 137/197 |
| 2,824,620 | 2/1958 | De Rossit | 55/16 |
| 2,830,859 | 4/1958 | Parsons | 92/79 |
| 2,958,391 | 11/1960 | Kidlaty | 92/79 X |
| 3,204,858 | 9/1965 | Dros | 417/385 |
| 3,277,795 | 10/1966 | Rietdyk | 92/84 |

Primary Examiner—Martin P. Schwadron
Assistant Examiner—R. H. Lazarus
Attorney—Frank R. Trifari ABSTRACT: For use in a hot-gas engine, compressor, and expansion machine, a partition wall permitting diffusion for removing and recovering gas diffused through a rolling diaphragm seal into a liquid diaphragm supporting column. The device includes an apparatus for maintaining a pressure differential across the diaphragm seal, a liquid storage chamber, and wire gauzes as a separator in a liquid container.

Patented Dec. 14, 1971　　3,626,811

INVENTORS.
ROELF JAN MEIJER
HENRICUS CORNELIS JOHANNES
　　BEUKERING
BY ALBERT AUGUST DROS

AGENT 3,626,811

ROLLING DIAPHRAGM SEAL MEANS FOR REMOVING AND RECOVERING DIFFUSED GAS

This application is a division of application Ser. No. 732,492 filed on May 21, 1968 and now U.S. Pat. No. 3,487,751, which is a continuation of application Ser. No. 514,293 filed on Dec. 16, 1965 and now abandoned.

The invention relates to a device constituting a seal constructed as a rolling diaphragm between two coaxially arranged elements which are movable relative to one another, the said seal separating two spaces, one of the said spaces being filled with a liquid and the other space being filled with a gas.

Examples of known devices of the type to which the present invention relates are hot-gas reciprocating engines, compressors and expansion machines. In these machines the rolling diaphragm is provided as a seal between the piston and the cylinder and forms with its one side part of the boundary of the working space. With its other side the rolling diaphragm engages liquid which serves as a support for the rolling diaphragm. It is desirable in these cases that the said liquid is at least substantially incompressible.

It has been found that during operation a certain diffusion of gas occurs out of the working space through the rolling diaphragm into the liquid. This diffusion greatly increases as the temperature rises. After some time if no preventive measures are taken, the concentration of the gas dissolved in the liquid exceeds the saturation concentration. This results in bubble formation meaning that the liquid no longer is incompressible. As a consequence even at a constant differential pressure across the rolling diaphragm the said rolling diaphragm will nevertheless vary in length. This, of course, adversely influences the life of the rolling diaphragm.

To prevent the occurrence of bubble formation in the liquid it is known to regularly refresh the liquid in the space under the rolling diaphragm. In this case a certain stream of liquid which contains little or no dissolved gas is continuously supplied to the space while simultaneously the same stream of liquid but now with a higher concentration of dissolved gas, is directed away from said space. In this manner the concentration of dissolved gas can be kept below the saturation concentration. However, a disadvantage of the said method is that the gas diffused through the rolling diaphragm is lost. The cost may be considerable particularly in case of more expensive types of gas.

A principle object of the invention is to provide a solution to the above-described problem in which the concentration of dissolved gas in the liquid space remains below the saturation concentration and the gas diffused by the rolling diaphragm is not lost.

The device according to the invention is characterized in that it includes a separator to remove and receive gas diffused through the rolling diaphragm out of the liquid.

The gas separated out of the liquid can subsequently be supplied again to the working space.

One embodiment of the device according to the invention comprises a separator that is formed by at least part of the wall of the space which contains the liquid, which part of the wall is manufactured from a material which permits diffusion of the gas concerned, the said part of the wall making a boundary with its side remote from the liquid space a storage container in which a pressure prevails which is lower than the pressure in the liquid space.

The gas diffused from the working space through the rolling diaphragm will then leave the liquid space through the said part of the wall. In this manner the end in view, namely recovery of diffused medium, is achieved with an extremely simple construction. Under certain circumstances the part of the wall which permits diffusion may be constituted by a second rolling diaphragm which faces the liquid space with its concave side.

A further embodiment of the device according to the invention, in which at least one liquid supply duct and at least one liquid exhaust duct communicate with the liquid space, comprises a separator which is constituted by a container consisting of at least two parts, the parts being separated from one another by a wall permitting diffusion of the gas concerned, the liquid exhaust duct communicating with the first part of the container which is provided with a further duct which communicates, if required, through a control mechanism with the supply duct to the liquid space. A pumping device is further provided for transporting liquid out of the first part of the container back to the liquid space and a pressure prevails in the second part of the container which is lower than the pressure in the first part of the container.

In said further embodiment liquid is always circulated by pumping, in which the pump need overcome only the resistance to flow of the ducts in question. When the liquid space is constructed so that the volume of that space remains constant when the elements move relative to one another and no leakage occurs, no further control devices or liquid-supplementing device need be provided. However, in practice some leakage along the piston will always occur so that the liquid will have to be augmented. Since the additional liquid is always more than the leak, a control device also will be required to ensure that the differential pressure across the rolling diaphragm does not vary.

When the pressure level in the working space is controllable, measures are taken to rapidly adapt the quantity of liquid in the liquid space below the rolling diaphragm to rapid variations of the pressure level.

Another embodiment of the device according to the invention which meets the above-described requirement comprises a further duct which communicates the first part of the container with its other end and opens into a liquid storage container which communicates, through a control mechanism, with the liquid space and in which a pressure prevails that is higher than the pressure in the liquid space below the rolling diaphragm. In this manner a certain buffer store of liquid is formed from which liquid can be transported to the liquid space below the rolling diaphragm when the pressure level in the working space varies.

When in a further embodiment of the device the space on the side of the rolling diaphragm remote from the liquid space contains hydrogen gas, the part of the wall permitting diffusion is manufactured from palladium.

A further embodiment of the device according to the invention comprises a structure in which the ends of the liquid exhaust duct and liquid supply duct remote from the liquid space open into a liquid storage container in which at least on an average a lower pressure prevails than in the liquid space below the rolling diaphragm, the opening of the said liquid supply duct in the storage container being separated from the opening of the liquid exhaust duct in the said container by one or more wire gauzes.

Because the liquid in the storage container is under a lower pressure, the gas dissolved in the liquid will separate in bubble form. Before the liquid is returned to the liquid space, hwoever, it must pass the wire gauzes, the gas bubbles appearing in the wire gauze and escaping out of the liquid along the wire gauze.

Another embodiment of the device according to the invention in which the rolling diaphragm engages the liquid with its concave side comprises a structure in which a pressure prevails in the storage container which at least substantially corresponds to the average pressure which prevails in the space on the side of the rolling diaphragm remote from the liquid space, a control valve being provided to the liquid exhaust duct and a pumping device being provided in the liquid supply duct. To hold the rolling diaphragm taut, a higher pressure will prevail in the liquid space than in the space on the other side of the rolling diaphragm. The liquid from that space will be reduced in pressure when it passes the control valve, the diffused gas being released in bubble form. These bubbles deposit on the wire gauze and escape out of the liquid. The deposited gas can be returned again to the gas space.

In another embodiment of the device according to the invention in which the rolling diaphragm engages the liquid with its convex side, a pressure prevails in the storage container which is at least substantially equal to the minimum pressure occurring in the space on the side of the rolling diaphragm remote from the liquid space, a control valve being arranged in the liquid exhaust duct and a pumping device being provided in the liquid supply duct.

According to a further embodiment of the device means are provided to bring the liquid in the first part of the container or in the storage container in which the wire gauzes are arranged at a temperature and/or pressure such that the saturation concentration of the gas in question in the liquid concerned is lower than the saturation concentration associated with the temperature and pressure which prevails in the liquid space below the rolling diaphragm. According to a further embodiment the device comprises one or more heating elements which can heat he liquid in the first part of the container or in the storage container provided with wire gauzes. As a result of the said heating the saturation concentration decreases which means that more gas escapes out of the liquid in bubble form so that a "cleaner" liquid is supplied to the liquid space.

Figure 1:
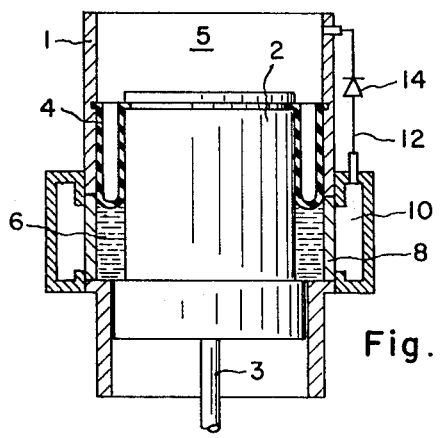

In order that the invention may readily be carried into effect a few embodiments thereof will now be described in greater detail, by way of example, with reference to the accompanying drawings, in which FIG. 1 diagrammatically shows a piston-cylinder combination in which a rolling diaphragm is used as a seal and in which part of the wall of the liquid space below the rolling diaphragm is manufactured from a material which permits diffusion of gas.

Figure 3:
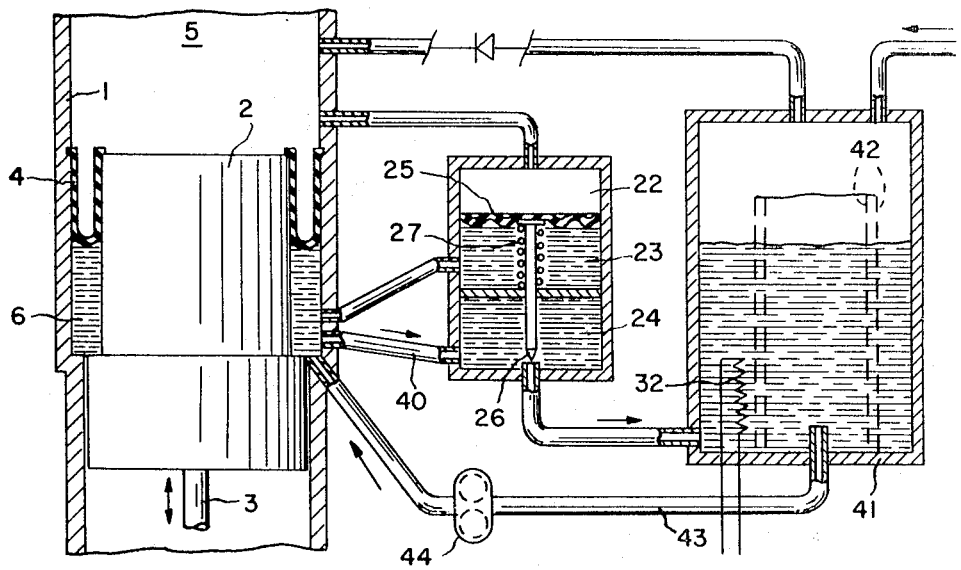

FIGS. 2 and 3 show diagrammatically two piston-cylinder combinations in which a rolling diaphragm is used as a seal and in which further means are provided for circulating liquid from the liquid space below the rolling diaphragm along a separator consisting of two containers separated by a wall permitting diffusion of gas.

In FIG. 1 reference numeral 1 denotes a cylinder in which a piston 2 reciprocates. The piston 2 is connected through a piston rod 3 to a driving mechanism (not shown). The seal between the piston and the cylinder is formed rolling a rolling diaphragm 4 which with its one side also bounds a working space 5 and with its other side engages liquid contained in a space 6. Because the piston 2 and the cylinder 1 have stepped constructions, the space 6 has a constant volume when the piston 2 moves in the cylinder. This means that a differential pressure across the rolling diaphragm 4 which is once adjusted is thereby maintained. The rolling diaphragm 4 is manufactured from a flexible substance, for example a polyurethane rubber. This substance in general permits a certain diffusion of the gas in the working space 5 to the working space 6. The gas diffused through the rolling diaphragm will dissolve in the liquid until the saturation concentration is reached. Then the gas will appear as bubbles in the liquid. This has the disadvantage that the liquid becomes more or less compressible so that at a fluctuating pressure in the working space 5 the rolling diaphragm will show variations in length.

In order to prevent the occurrence of gas bubbles in the liquid, a part 8 of the walls of the space 6 is manufactured from a material which permits diffusion of the gas in question. This part of the wall may be manufactured from the same material as the rolling diaphragm. When the working space contains hydrogen, the part of the wall may be manufactured, for example from palladium. The part 8 of the wall forms a boundary with its side remote from the space 6 of a container 10. This container communicates, through a duct 12 and a check valve 14 arranged therein, with the working space 5. This means that in the container 10 at most the minimum pressure can prevail which occurs in the working space. When gas has diffused through the rolling diaphragm 4 to the liquid space 6, this diffused gas will diffuse through the part 8 of the wall to the container 10 as a result of the average higher pressure in the space 6 with respect to the pressure in the container 10. The gas may then be returned to the working space 5 out of the said container 10. In this relatively simple manner it has been achieved that no gas bubbles are formed in the liquid while the diffused gas is also recovered.

FIG. 2 again shows a piston-cylinder combination as shown in FIG. 1. The corresponding components have like reference numerals. The walls of the liquid space 6, however, in this case are manufactured from a material which permits no diffusion. In this embodiment the liquid space 6 communicates with a liquid exhaust duct 15 which, with its other end communicates with a part 16 of a container 17. The container 17 is separated into the parts 16 and 19 by a partition is permitting diffusion. The part 16 again communicates with the liquid space 6 through a further duct 20 which includes a pump and a control device 21.

The control device 21 comprises three spaces 22, 23, and 24. The space 22 communicates through a narrow duct with the working space 5 so that in that space the same average pressure prevails as in the working space. The space 23 also communicates through a narrow duct with the liquid space 6 so that in that space the same average pressure prevails as in the liquid space 8. The spaces 22 and 23 are separated from one another by a diaphragm 25 to which the valve spindle of a valve 26 is connected. In order to maintain a given differential pressure between the spaces 5 and 6 and 22 and 23 respectively, a pressure spring 27 is provided.

The device further comprises a additional liquid pump 29 which supplies liquid to the space 6 through a duct 30. As a result of the action of the liquid pump in the duct 20 liquid flows out of the space 6 into the part 16 of the container 17.

Since a pressure is maintained in the space 15 which is lower than the liquid pressure, gas the space 16 will diffuse through the partition 18 which permits diffusion into the space 19. The gas diffused to the space 19 can be conducted away through duct 31. The space 16 includes a heating element 32 which heats the liquid in the space. As a result of the heating of the liquid the saturation concentration of the gas in question in the liquid will become lower as a result of which more gas will diffuse through the partition 18. The liquid flows back to the liquid space 6 out of the space 16 through duct 20. As a result of the seal between the piston 2 and the cylinder 1, some liquid may leak away under conditions out of the space 6 into the pump. The liquid pump 29 supplies liquid to the space 6 to compensate for the leak losses. In practice the pump 29 will supply more liquid than has leaked away. The excess liquid has to be conducted away again since otherwise the differential pressure across the rolling diaphragm 4 may vary. In order to ensure a constant differential pressure across the rolling diaphragm 4 a control device 21 is provided. When the pressure in the liquid space 6 becomes higher than corresponds to the desired differential pressure, the diaphragm 25 will show a deflection upwards, as a result of which the valve 26 is lifted and liquid can flow back to the sump out of the space 24 through the duct 33.

In this manner it is achieved again that the liquid in the space 6 remains incompressible in which the gas diffused through the rolling diaphragm is not lost.

FIG. 3 shows the same piston-cylinder combination as disclosed in FIG. 2. The difference is that in this embodiment a storage container 35 is provided in the duct 20 between the space 16 and control device 21. On its upper side the said storage container communicates through a narrow duct 48 with the working space 5 so that the average pressure of the working space 5 will prevail in the storage container 15. In the storage container the liquid and the gas are separated from one another by a lightweight piston-shaped body 36 which permits no diffusion. The operating condition of the said piston-shaped body 36 is determined by an exhaust 37. The storage container contains a comparatively large quantity of liquid which enables the pressure level in the device to vary comparatively rapidly without the rolling diaphragm 4 being adversely influenced by it.

What is claimed is:

1. A device comprising
  a. two axially spaced elements which are relatively movable, b. at least one seal constructed as a rolling diaphragm between the elements, thereby defining on one side of the seal a first space for liquid and on the opposite side of the seal a second space for gas, a quantity of the gas being diffusible through the seal into the liquid and c. a separator operatively connected to the device, the separator comprising a partition wall having a first side adjacent a portion of said first space, gas in said liquid being diffusible through the partition and thereby removed from said liquid.

2. A device as defined in claim 1 wherein the separator comprises an enclosure defining therein a third space, one wall of the enclosure being said partition having its two sides adjacent the first and third spaces respectively, the third space having a lower pressure than the pressure in the first space.

3. A device as defined in claim 2 wherein the second space contains hydrogen gas and at least part of said partition wall comprises palladium.

* * * * *